(12) United States Patent
Kikta et al.

(10) Patent No.: US 9,066,321 B1
(45) Date of Patent: Jun. 23, 2015

(54) PROXY-BASED ESTABLISHMENT OF A COMMUNICATION SESSION

(75) Inventors: Robert J. Kikta, North Bend, WA (US); Charles C. Gumas, Fairfax, VA (US)

(73) Assignee: Exelis Inc., McLean, VA (US)

( * ) Notice: Subject to any disclaimer, the term of this patent is extended or adjusted under 35 U.S.C. 154(b) by 173 days.

(21) Appl. No.: 13/448,912

(22) Filed: Apr. 17, 2012

(51) Int. Cl.
*H04W 76/02* (2009.01)
*H04B 7/185* (2006.01)

(52) U.S. Cl.
CPC ........... *H04W 76/02* (2013.01); *H04B 7/18539* (2013.01)

(58) Field of Classification Search
CPC ........... H04B 7/18539; H04B 7/18508; H04B 7/185; H04L 63/0281
USPC .................. 455/411, 435.1, 13.1, 430, 7, 3.02
See application file for complete search history.

(56) References Cited

U.S. PATENT DOCUMENTS

| | | | |
|---|---|---|---|
| 6,282,542 B1 | 8/2001 | Carneal et al. | |
| 7,602,782 B2 | 10/2009 | Doviak et al. | |
| 7,694,008 B2 | 4/2010 | Chang et al. | |
| 7,945,692 B2 | 5/2011 | Ramadas | |
| 2003/0069925 A1 | 4/2003 | Weaver et al. | |
| 2003/0186680 A1* | 10/2003 | Bhasin et al. | 455/411 |
| 2004/0088383 A1 | 5/2004 | Dillon | |
| 2008/0039079 A1* | 2/2008 | Iyer et al. | 455/432.1 |
| 2008/0310349 A1* | 12/2008 | Ulupinar et al. | 370/328 |
| 2009/0172801 A1* | 7/2009 | Friedrich et al. | 726/12 |
| 2011/0026453 A1 | 2/2011 | Yan | |

* cited by examiner

*Primary Examiner* — Olumide T Ajibade Akonai
*Assistant Examiner* — Edward Zhang
(74) *Attorney, Agent, or Firm* — Edell, Shapiro & Finnan LLC

(57) ABSTRACT

A technique for proxy-based establishment of a communication session between a communication terminal and a network node device. In one example technique, a rapid-access message is received at a proxy device located in proximity to a network node device. The rapid-access message is received from a communication terminal. In response to the rapid-access message, the proxy device exchanges a plurality of messages with the network node device to perform a plurality of session establishing phases such that the proxy device establishes the communication session with the network node device on behalf of the communication terminal. The proxy device then transmits at least one confirmation message to the communication terminal to notify the communication terminal of the establishment of the communication session between the communication terminal and the network node device.

26 Claims, 6 Drawing Sheets

PROXY-BASED ESTABLISHMENT OF A COMMUNICATION SESSION

BACKGROUND

Efficient use of link resources is a concern in a wide range of communication systems. In certain instances, a terminal within a communication network may need to transmit or receive a message that requires use of a link or channel for only a very brief period of time. Sending such brief messages may be inefficient from a link usage standpoint, since the duration of the message itself may be a small fraction of the overall time required to establish and then tear down the link or channel required to transmit the message between transmitting and receiving terminals.

For example, the Iridium® satellite system provides worldwide voice and data service to geographically distributed subscriber units (e.g., radios) using a constellation of low Earth orbit satellites. Iridium is a registered trademark of Iridium Satellite LLC. Each satellite contributes an array of antenna spot beams such that the satellite constellation provides coverage over the entire surface of the Earth. Iridium subscriber units may acquire information, such as sensor data, that needs to be shared with other units or with a network manager or a gateway device linked to other networks. One example of sensor data is position location information (PLI) such as GPS position data that indicates the subscriber unit's current position. In order to transmit data, a terminal must first establish a communication session with a satellite, which results in several seconds of link usage to transmit messages that may have transmission durations of a fraction of a second. Accordingly, it would be desirable in this and other communication network contexts to have an efficient approach for establishing communication sessions.

SUMMARY

Devices, methods and instructions encoded on computer readable medium are provided herein for proxy-based establishment of a communication session between a communication terminal and a network node device. In one example technique, a rapid-access message is received at a proxy device located in proximity to a network node device. The rapid-access message is received from a communication terminal. In response to the rapid-access message, the proxy device exchanges a plurality of messages with the network node device to perform a plurality of session establishing phases such that the proxy device establishes the communication session with the network node device on behalf of the communication terminal. The proxy device then transmits at least one confirmation message to the communication terminal to notify the communication terminal of the establishment of the communication session between the communication terminal and the network node device.

It will be appreciated that the exchange of the plurality of messages is, in practice, a plurality of message exchanges (i.e., a series of transmissions and responses) between the proxy device and the gateway. In one option, the plurality of message exchanges between the proxy device and the network node device comprises transmitting a home gateway access message from the proxy device to the gateway, and receiving an access decision message from the gateway at the proxy device. In another option, the exchanging of the plurality of messages between the proxy device and the network node device further includes transmitting a call control setup request message from the proxy device to the gateway, receiving an authentication request message from the gateway at the proxy device, transmitting an authentication response message from the proxy device to the gateway, and receiving a call control setup accept message from the gateway at the proxy device.

The rapid-access message may comprise information enabling the proxy device to function on behalf of the communication terminal to establish the communication session. In one such option, the rapid-access message comprises authentication information for authenticating the communication terminal and/or a user of the communication terminal. In another option, the rapid-access message comprises an indication of the type of service requested by the communication terminal. In a still other option, the rapid-access message comprises an indication of connection destination (e.g., dialed digits). In yet another option, rapid-access message hides the over-the-air (OTA) identity of the communication terminal.

The above and still further features and advantages of the present invention will become apparent upon consideration of the following definitions, descriptions and descriptive figures of specific embodiments thereof wherein like reference numerals in the various figures are utilized to designate like components. While these descriptions go into specific details of the invention, it should be understood that variations may and do exist and would be apparent to those skilled in the art based on the descriptions herein.

DETAILED DESCRIPTION

Figure 1:
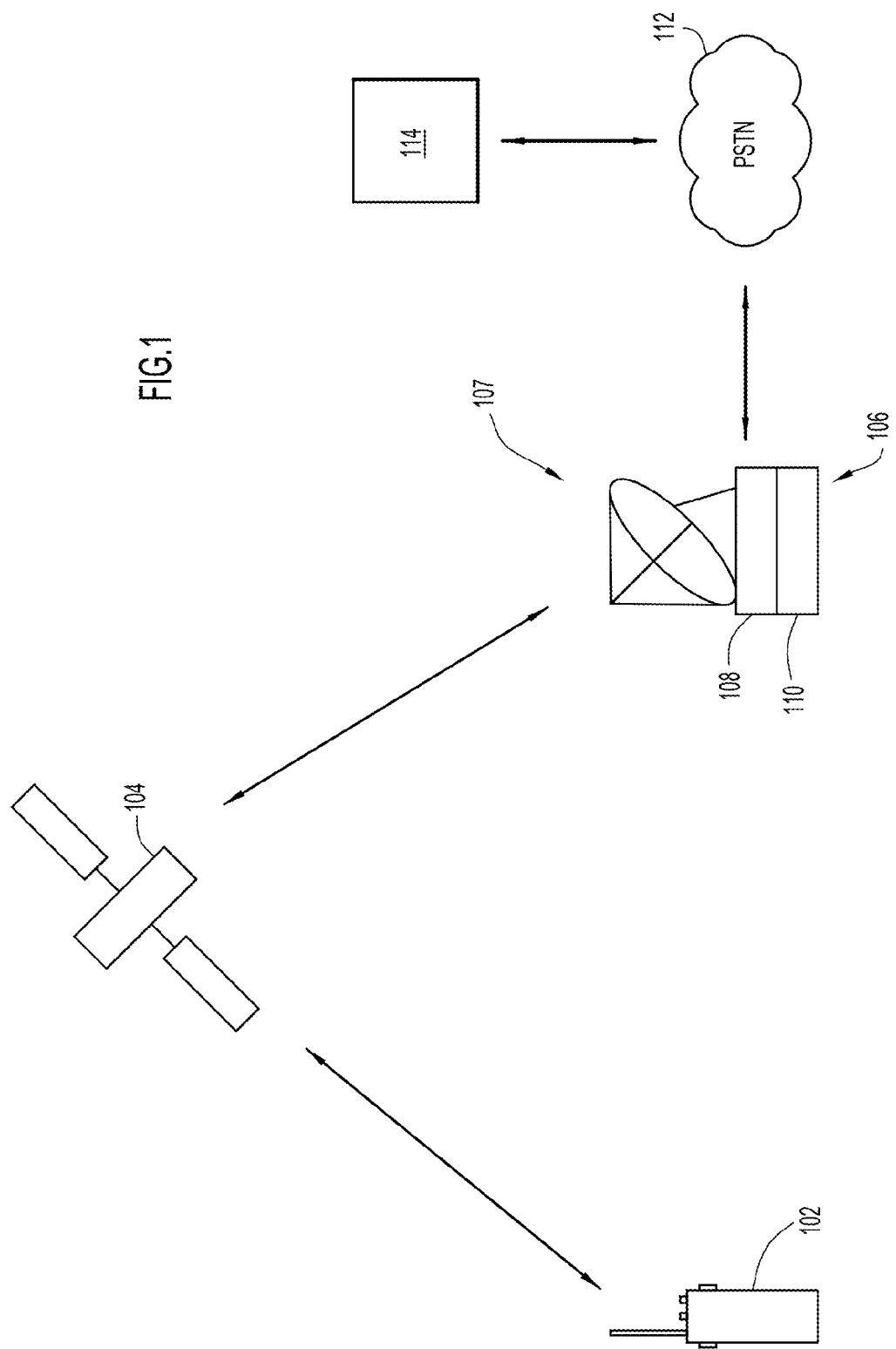
FIG. 1 is a conceptual diagram illustrating a portion of a conventional satellite communication system including a terrestrial communication terminal communicating with a terrestrial gateway via an Earth-orbiting satellite.

The techniques described herein for proxy-based communication session establishment are suitable for implementation in a wide variety of communication systems including cellular, WiMAX, low Earth orbit (LEO) satellite communications (e.g., the Iridium® system), and geostationary Earth orbit (GEO) satellite communications. FIG. 1 conceptually illustrates a conventional satellite communication system such as the Iridium® satellite system.

The Iridium® satellite system provides worldwide voice and data service to geographically distributed subscriber units/terminals (e.g., radios) using a constellation of low Earth orbit satellites. Each satellite contributes an array of antenna spot beams such that the satellite constellation provides coverage over the entire surface of the Earth. More specifically, geographically distributed subscriber terminals 102 are capable of transmitting radio signals to, and receiving radio signals from, satellites in the Iridium® satellite constellation (one such satellite 104 is shown in FIG. 1). The Iridium® terminals 102 can be wireless radios, telephones or some form of data modem devices and can transmit and receive signals comprising voice signals and/or data (e.g., text, image, video, etc.). At any given time, there are approximately 66 operational satellites in the Iridium® constellation, and each satellite has a total of 48 spot beams per satellite. Since the satellites are in low Earth orbit, the region of the Earth's surface covered by each of the individual antenna beam patterns is constantly shifting.

Conventionally, when a subscriber initiates a voice or data transmission from an Iridium® subscriber terminal, the transmission traverses the network via an uplink from the terminal to a satellite. The satellite, acting as a router, may direct the transmission to another subscriber terminal or to an Earth or terrestrial terminal facility via a downlink or to another satellite via a cross link, with the transmission ultimately being down linked to another subscriber terminal or to an Earth terminal facility by another satellite. FIG. 1 illustrates an example Earth terminal facility 106 that transmits/receives signals to/from satellite 104. The Earth terminal facility 106 comprises an antenna/receiver module 107, a gateway 108, and a switch subsystem 110. The Earth terminal facility 106 is configured to provide a radio-link interface between the satellites and other terrestrial facilities. It is to be appreciated that the switch subsystem 110, and the Earth terminal facility 106 in general, may link the satellite communications to a number of different types of public or private networks. In the example of FIG. 1, the switch subsystem 110 provides a link to a public switched telephone network (PSTN) 112 so that voice calls may be routed to a communication terminal 114. In other arrangements, switch subsystem 110 (or other elements) may provide a link to, for example, the public Internet.

As used herein, the term communication terminal or simply "terminal" can be any device capable of transmitting and/or receiving signals, including but not limited to: a fixed-position or mobile RF transmitter or receiver, a handheld or body-mounted radio; any type of wireless or mobile telephone (e.g., analog cellular, digital cellular, or satellite-based); a radio carried on, built into or embedded in a ground-based or airborne vehicle; a satellite-mounted transmitter or receiver; or any electronic device equipped with wireless transmission or reception capabilities, including multimedia terminals capable of transmitting and/or receiving audio, video, and data information. As used herein, the term "terrestrial" refers to any ground-based, maritime, or airborne location (i.e., not in orbit or in space).

Figure 2:
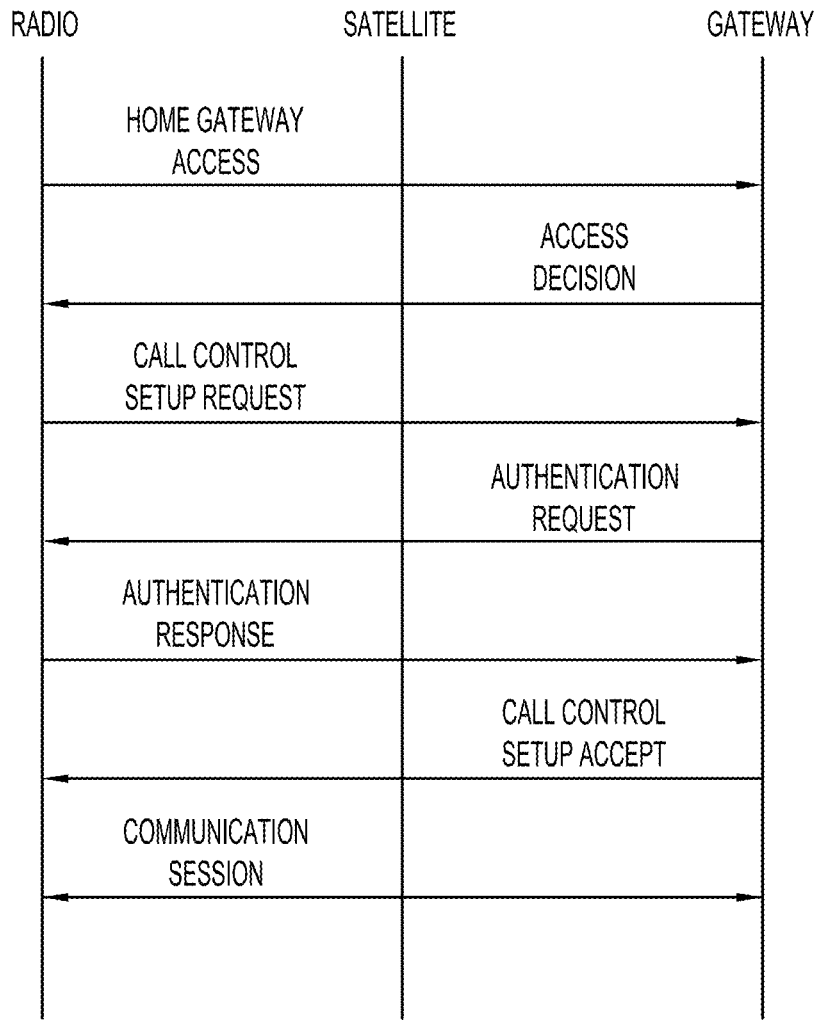
FIG. 2 is a signaling diagram illustrating a conventional sequence of messages conveyed between a terrestrial communication terminal and a terrestrial gateway to establish a communication session.

FIG. 2 is a signaling diagram illustrating a conventional sequence of messages conveyed between a terrestrial communication terminal and a terrestrial gateway to establish a communication session. It is well known that when a communication terminal intends to transmit voice signals and/or data (i.e., make a call), the communication terminal does not initially have any network resources (traffic channels) dedicated thereto. Instead, the communication terminal must signal to the network its intent to transmit, and then acquire a traffic channel. This traffic channel acquisition process involves the exchange of several messages between the transmitting terminal (the radio in FIG. 2) and a network node (the satellite in FIG. 2). For ease of illustration, these channel acquisition messages are omitted from FIG. 2 and it is assumed that the radio has acquired a traffic channel from the satellite. Also, it will be appreciated that the specific signaling utilized in the example of FIG. 2 is merely for purposes of illustration and that the specific signaling utilized in any particular application may vary.

After acquisition of the traffic channel, a communication session is established between the radio and the gateway for the ultimate purpose of exchanging voice signals and/or data. The establishment of the communication session involves the exchange of various messages between the radio and the gateway through the satellite (i.e., the messages are sent via uplinks/downlinks with the satellite). When a message is received by the satellite, the satellite may be configured to repackage/reformat the messages for forwarding to the intended endpoint. Similarly, an antenna and associated transceiver circuitry (collectively shown as antenna/receiver module 107 in FIG. 1) operate with the gateway to transmit/receive signals to/from the satellite. Merely for ease of illustration of the examples described herein, the satellite and antenna module are considered transparent during the establishment of a communication session and the messages are described has being transmitted directly between the radio and the gateway, and vice versa.

During establishment of a communication session, the radio first transmits a home gateway access message to the satellite. This home gateway access message includes routing information, geographic data, service type, and a user identifier. The gateway uses the contents of the home gateway access message to determine the type of service (e.g., voice or data) requested by the radio. In response to the home gateway access message, the gateway transmits an access decision message back to the radio. The access decision informs the radio whether it is to be granted access to the gateway.

If the access decision indicates that the radio has been granted access to the gateway, the radio transmits a call control setup request. In response, the gateway transmits an authentication request to the radio that identifies certain information required from the radio in order for the gateway to authenticate the user and/or the radio. The radio responds to the authentication request with an authentication response that includes the requested authentication information. After the user/radio are authenticated, the gateway will transmit a call control setup accept message to the radio. At this point, the two-way communication session between the radio and the gateway has been established. The various messages described above are well known in the art and will not be described further herein.

As noted, in the above conventional arrangement the various messages exchanged between the radio and the gateway in order to establish the communication session are routed through the satellite. In conventional satellite communication systems, such as the Iridium® satellite system, there are inherent propagation delays as the transmitted messages are sent on the uplink to the satellite and on the downlink back to a terrestrial device. For example, in certain circumstances it may take upwards of approximately 750 ms to 1 second for each of the messages to be transmitted between the communication terminal and the gateway, and vice versa. Because multiple messages are exchanged during establishment of a communication session, the call establishment process may take upwards of approximately 8 to 10 seconds to complete. Such delays are problematic, particularly when transmitting intermittent data traffic or short burst messages that have a time length that is significantly shorter (e.g., 1 to 3 seconds)

when compared to the time required for establishment of the communication session. As traffic volumes increase, the impact of such delays is substantial, even with longer-duration traffic. As such, a significant amount of the network bandwidth is used for establishment of the communication session, rather than for the communication session. For example, 5 seconds of extra setup time for each of 100,000 sessions translates into nearly 140 hours worth of unproductive network usage. As described herein and detailed below, proxy-based techniques enable significant reductions (relative to conventional arrangements) in the time required to establish a communication session.

Figure 3:
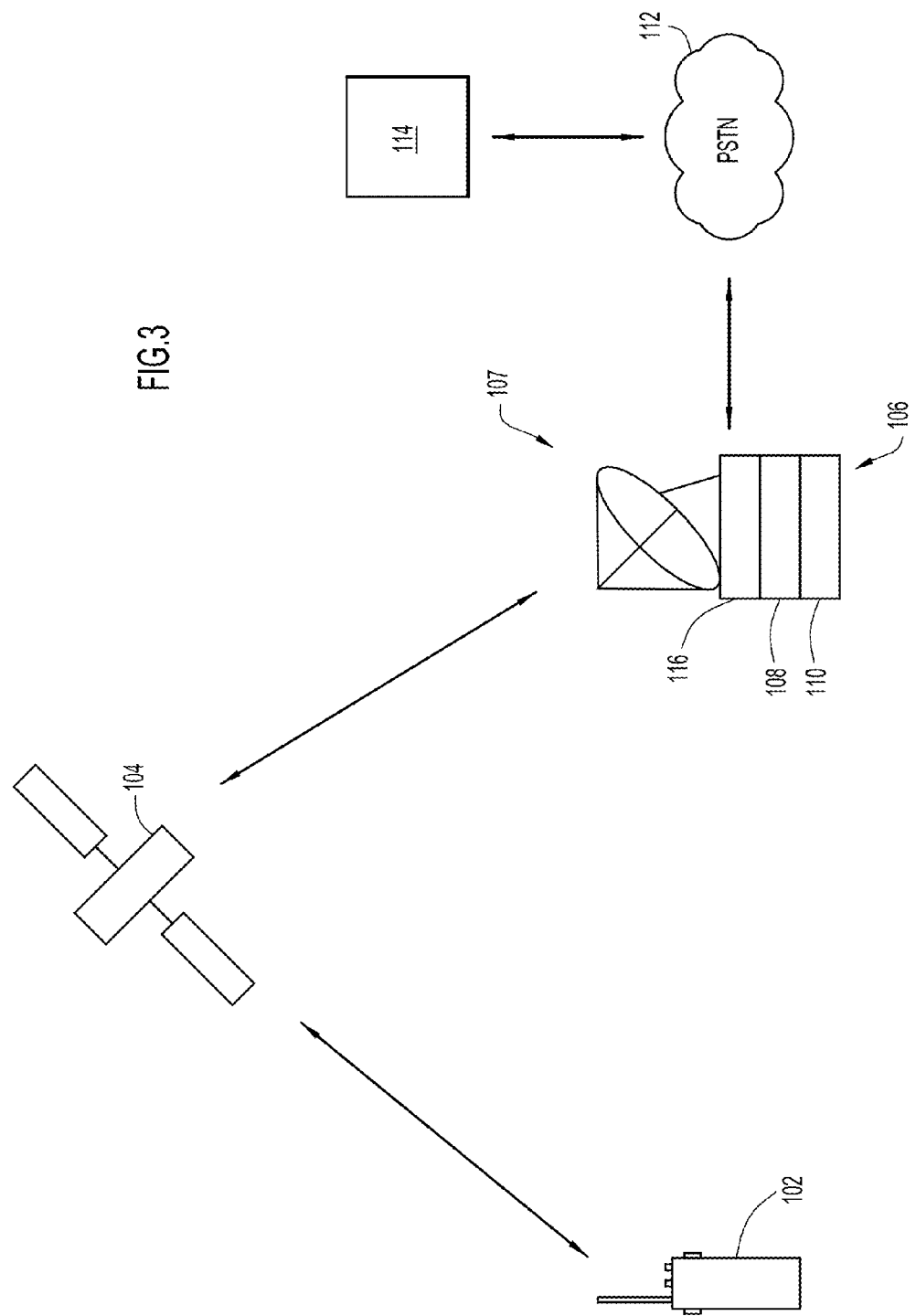
FIG. 3 is a conceptual diagram illustrating a portion of a satellite communication system in which a proxy device located in proximity to a terrestrial gateway is used to establish a communication session between a terrestrial communication terminal and the terrestrial gateway via an Earth-orbiting satellite.

FIG. 3 is a conceptual diagram illustrating a portion of a satellite communication system in which a proxy device is located in proximity to a terrestrial gateway. As described below, the proxy device is used to establish a communication session between a terrestrial communication terminal and the terrestrial gateway (via an Earth-orbiting satellite) in a manner that reduces, compared to conventional arrangements, the time required to establish the communication session. More specifically, a first communication terminal 102 desires to make a call (voice or data) to a second communication terminal 114. To do so, the first terminal 102 is required to establish a communication session with a gateway 108 that is configured to route signals received from the first terminal 102 through a switch subsystem 110 to a PSTN 112 and ultimately to the second terminal 114.

More specifically, in the example of FIG. 3, first communication terminal 102 is configured to acquire a traffic channel from the communication network (as known in the art). The first communication terminal 102 is then configured to generate and transmit a rapid-access proxy message. This rapid-access message is routed to a proxy device 116 located in proximity to the gateway 108. The rapid-access message is a new message that includes information that enables the proxy device 116 to function as a proxy or substitute for, or on behalf of, the communication terminal 102 during establishment of a communication session between the communication terminal and the gateway 108. Further details of the content of the rapid-access message are provided below.

As used herein, the position or location of the proxy device 116 "in proximity to" or "near" the gateway means that the proxy device is located such that there is substantially less propagation delay, with respect to communication terminal 102, when messages are transmitted between the proxy device 116 and the gateway 108. In one specific example, the proxy device 116 is co-located in the same building, facility, or campus as the gateway. However, such co-location is not necessary.

In the specific example of FIG. 3, proxy device 116 is an "inline" device positioned between the antenna/receiver module 107 and the gateway 108. As such, proxy device 116 is configured to monitor the output of antenna/receiver module 107 for a rapid access message. With this configuration, proxy device can intercept incoming rapid access messages before they reach gateway 108, while passing other incoming messages to gateway 108. Proxy device 116 can then generate from each rapid access message the sequence of messages necessary for establishing a communication session with gateway 108 and can insert these messages into the stream of incoming messages being passed to gateway 108. This configuration allows gateway 108 to be unaware of the presence and operation of proxy device 116, such that the proxy techniques described herein can be carried out without any modification to an existing gateway device (i.e., the proxy scheme is transparent to the gateway device).

In other examples, proxy device 116 is not positioned "inline," and gateway 108 receives incoming messages, including rapid access messages, from the antenna/receiver module 107 without passing through proxy device 116. In this case, proxy device 116 may monitor the incoming data stream, including rapid access messages, by receiving the data stream in parallel with gateway 108 and then perform the proxy scheme by exchanging a sequence of messages with gateway 108 over a wired or wireless connection in response to receiving a rapid access message. Alternatively, proxy device 116 may not monitor the incoming message stream but instead receive rapid access messages from gateway 108, which triggers the exchange of sequences of messages between proxy device 16 and gateway 108 to establish a communication session. In each of these arrangements, gateway 108 receives the rapid access messages and so must be able to recognize, or at least ignore, the rapid access messages.

In such arrangements, the gateway 108 may be configured to receive a rapid access message and then route the message to the proxy device 116.

Figure 4:
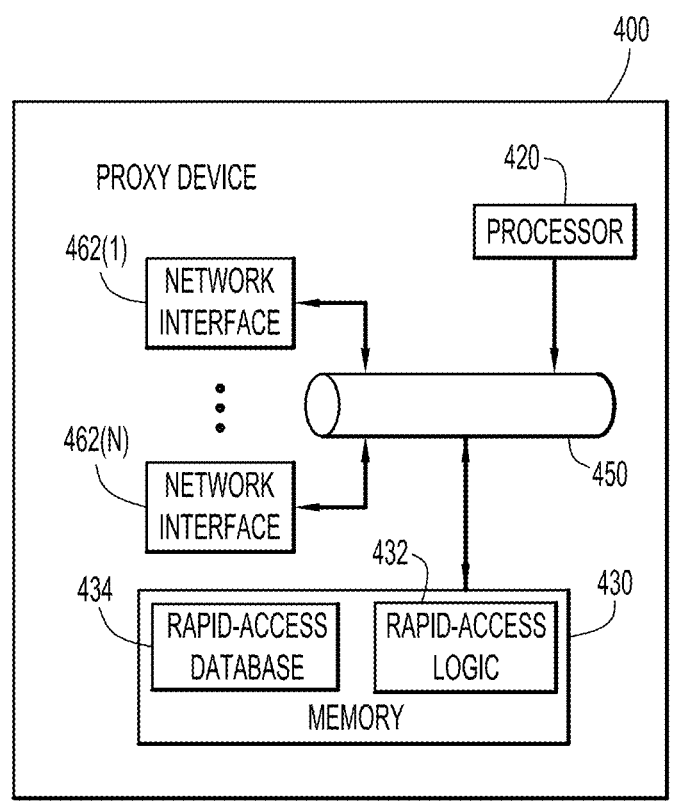
FIG. 4 is a notional block diagram illustrating major components of a proxy device for use in establishing a communication session between a terrestrial communication terminal and a terrestrial gateway via an Earth-orbiting satellite.

FIG. 4 is a block diagram illustrating an example proxy device 400 configured to operate with a terrestrial station (e.g., gateway) to establish a communication session between the terrestrial station and a network during acquisition congestion of the communication network. Proxy device 400 includes a plurality of network interfaces 462(1)-462(N) configured to couple the proxy device 400 to, for example, an antenna module, gateway, etc. Network interfaces 462(1)-462(N) may comprise any combination of a number of different types of Input/Output (I/O) interfaces such as, for example, serial ports, parallel ports, universal serial buses (USB) ports, Peripheral Component Interface (PCI) buses, Ethernet interfaces, Transmission Control Protocol (TCP) interfaces, Internet Protocol (IP) interfaces, and/or wireless interfaces (e.g., 802.11n). Network interfaces 462(1)-462(N) may be configured to transmit/receive virtually any type of content, including but not limited to: audio/voice signals and data signals, including video or visual display signals, and any other types of media or content.

Proxy device 400 further includes a processing capability represented in FIG. 4 by processor module 420. Processor 420 is capable of executing program instructions (i.e., software) for carrying out various operations and tasks. For example, processor 420 can interpret and respond to data and commands received from network interfaces 462(1)-462(N), perform computations, cause message signals to be transmitted via network interfaces 462(1)-462(N), cause information to be stored, etc. Processor 420 is, for example, a microprocessor, a microcontroller, a digital signal processor, etc.

A storage capability of proxy device 400 is represented by storage/memory module 430. Storage/memory module 430 can store program instructions (i.e., software) to be executed by processor 420 to carry out operations. For example, in this configuration storage/memory 430 includes rapid-access logic 432. Thus, the operations and methodologies described herein can be carried out by executing instructions stored on a computer readable medium (i.e., software) on a processor or processors located within proxy device 400. As used herein, the term "computer readable medium" refers to non-transitory (tangible) media (e.g., memory or storage devices). Storage/memory module 430 is a tangible processor-readable or computer-readable memory that stores or is encoded with instructions (rapid access logic 432) that, when executed by processor 420, causes processor 420 to perform the functions described herein. While FIG. 4 shows a processing environment comprising a data processor 420 that executes software stored in storage/memory module 430, an alternative processing environment may include a fixed data processing element, such as an application specific integrated circuit (ASIC) that is configured, through fixed hardware logic, to perform the functions of the logic. Yet another possible data processing environment is one involving one or more field programmable logic devices or firmware, or a combination of fixed processing elements and programmable logic devices.

Memory 430 also includes a rapid-access database 434. As described in greater detail below, rapid-access database 434 stores attributes of one or more communication terminals that may be used by the proxy device to establish a communication session.

Proxy device 400 may take a number of different forms and may comprise, for example, a server or computer. In certain embodiments, proxy device 400 may include a command-line interface (CLI) or a user interface (not shown in FIG. 4) that allows a user to interact with device 400. The user interface can include a display device, user input devices such as a keypad/keyboard, and an audio input/output such as a microphone and speaker.

The interconnections between the components of proxy device 400 are represented generally in FIG. 4 with a bus structure 450. In general, processor 420, storage/memory module 430, transmitter 462, and receiver 464 can be interconnected in any suitable manner.

FIG. 4 is an example in which the proxy device is a stand-alone component (e.g., server, computer, etc.) that is separate from a gateway. However, it would be appreciated that the functionality of a proxy device may, in certain circumstances, be incorporated into a conventional gateway such that the gateway itself performs the functions of the proxy.

Figure 5:
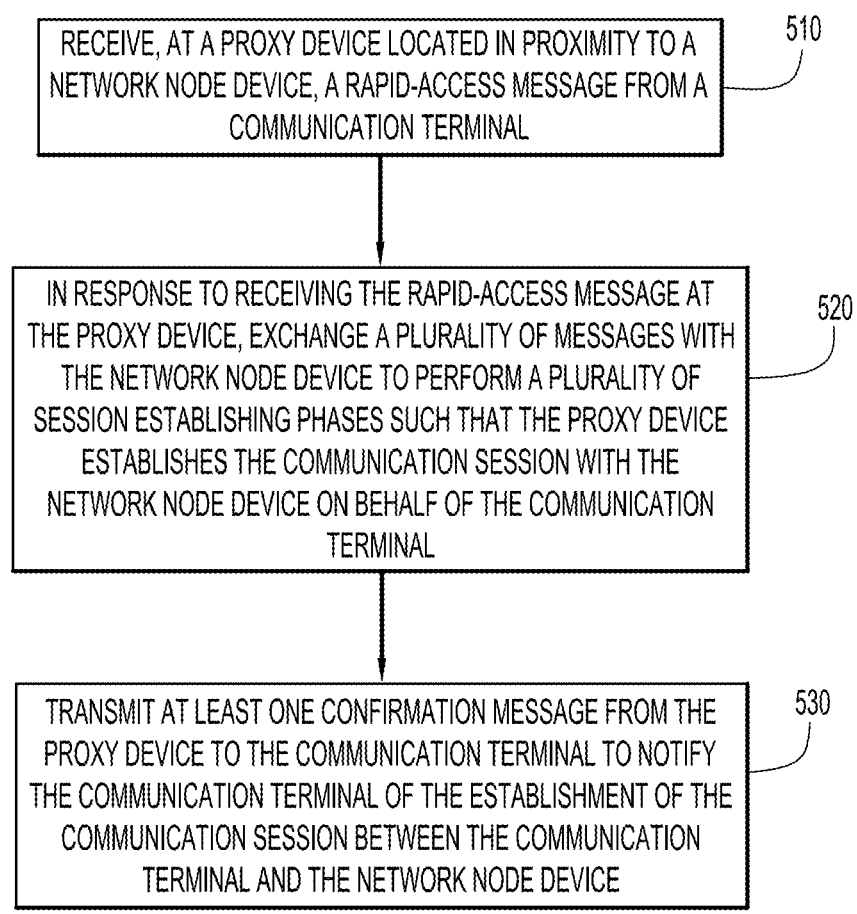
FIG. 5 is a functional flow diagram of operations performed by a proxy device to establish a communication session between a terrestrial communication terminal and a terrestrial gateway via an Earth-orbiting satellite.

Operations performed by a proxy device to establish a communication session between a communication terminal and a network node device (e.g., terrestrial station) in accordance with the disclosed techniques are shown in the flow diagram of FIG. 5 at a top level. In operation 510, a rapid-access message is received from a communication terminal at a proxy device. The proxy device is located in proximity to the network node device. As described below, the rapid-access message comprises information enabling the proxy device to function on behalf of the communication terminal to establish the communication session with the network node device.

In operation, 520, the proxy device exchanges a plurality of messages with the network node device to perform a plurality of session establishing phases such that the proxy device establishes the communication session with the network node device on behalf of the communication terminal. Further details of the session establishing phases and the exchanged messages are provided below. In operation 530, at least one confirmation message is transmitted from the proxy device to the communication terminal to notify the communication terminal of the establishment of the communication session between the communication terminal and the network node device.

Figure 6:
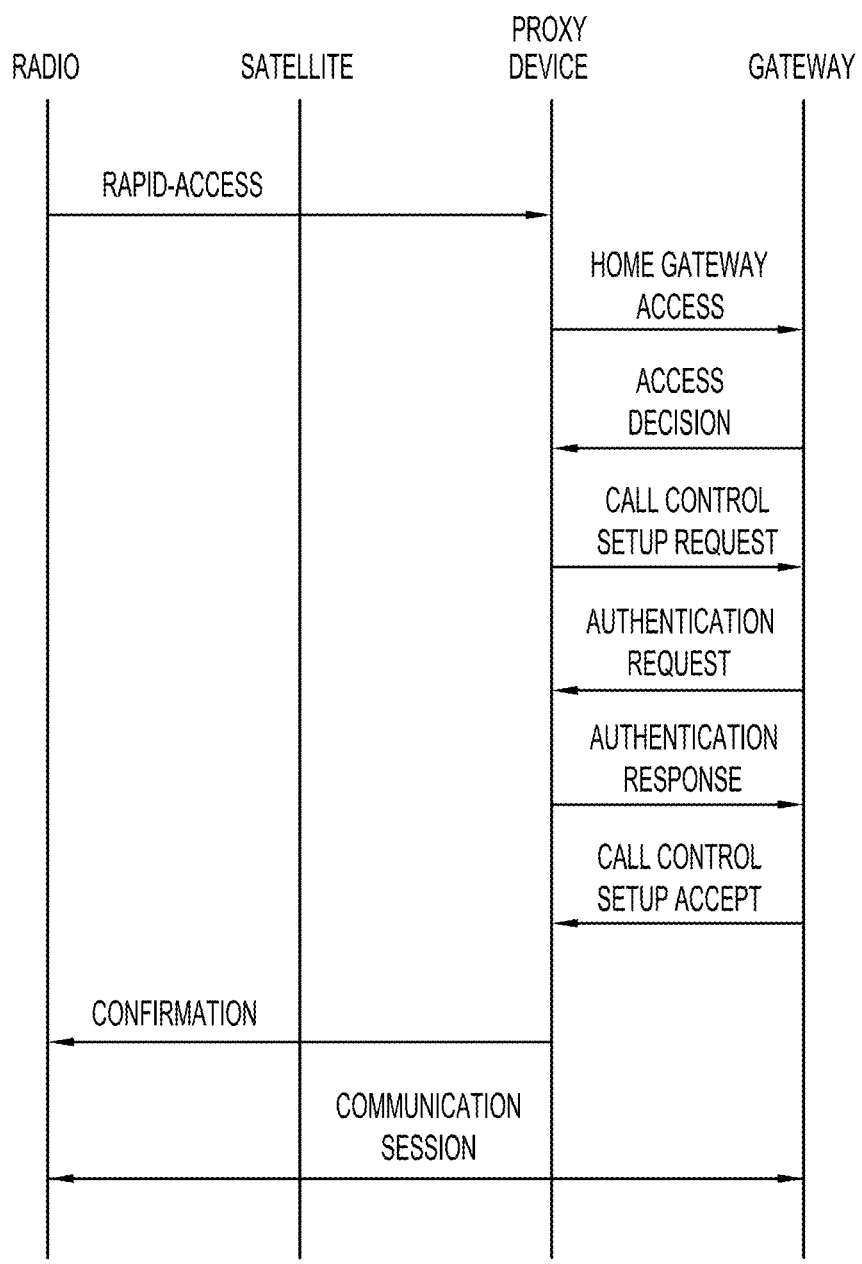
FIG. 6 is a signaling diagram illustrating a sequence of messages conveyed between a terrestrial communication terminal, proxy device, and a terrestrial gateway to establish a communication session.

The following examples illustrate the concepts related to a proxy-based technique for establishment of a communication session in the context of the Iridium® satellite communication system. In this context, a communication terminal (subscriber units) intends to establish a communication session with a network node device (e.g., gateway) via an Iridium® satellite. FIG. 6 is a signaling diagram illustrating within this example embodiment a sequence of messages conveyed between transmitting terminals (e.g., terrestrial subscriber units), a proxy device, and a receiving network node device (e.g., a gateway) to establish a communication session.

As noted above, when a communication terminal intends to transmit voice signals and/or data (i.e., make a call), the communication terminal does not initially have any network resources (traffic channels) dedicated thereto. Instead, the communication terminal must signal to the network its intent to transmit, and then acquire a traffic channel. This traffic acquisition process involves the exchange of several messages between the transmitting terminal (the radio in FIG. 6) and a network node device (the satellite in FIG. 6). For ease of illustration, these channel acquisition messages are omitted from FIG. 6 and it is assumed that the radio has acquired a traffic channel from the satellite.

After acquisition of a traffic channel, a communication session is established between the radio and the gateway in order to exchange voice signals and/or data. However, in contrast to conventional arrangements in which the establishment of the communication session involves the exchange of various messages between the radio and the gateway, in the embodiments described herein a proxy device is provided to communicate with the gateway during establishment of the session. More specifically, the radio is configured to generate and transmit a rapid-access message to the proxy device which is located in proximity to the gateway.

The rapid-access message is a new message that includes information that enables the proxy device to operate on behalf of the communication terminal during establishment of the communication session with the gateway (i.e., no additional requests for information to the communication terminal are necessary). For example, in certain embodiments the rapid-access message includes all the information (e.g., terminal characteristics, connection destination, etc.) that is needed for the proxy device to establish the communication session with the gateway (i.e., no additional information is needed). In another embodiment, the rapid-access message includes information, such as indicators or pointers, that is used by the proxy device to access or "look-up" terminal characteristics (e.g., authentication key material), connection destination (e.g., dialed digits), or other information, in a database (e.g., rapid-access database 434 in FIG. 4) stored in the proxy device. The transmission of only database pointers, rather than the actual information, conserves network bandwidth, but also provides other advantages. For example, one added advantage of the use of the database is that it enables the proxy device to service hundreds of thousands of communication terminals, rather than a smaller subset of terminals where the proxy device is configured to receive all of the information in the rapid-access message. Additionally, the use of the database eliminates the need to send any private information over the network, thereby protecting the integrity of the information.

One aspect of certain embodiments is the need for the various components to identify and trust one another prior to establishing the communication session. For example, the proxy device generally needs to identify a communication terminal that has transmitted a rapid-access message and to trust that the communication terminal is correctly representing itself. As such, the rapid-access message may include authentication information for authenticating the communication terminal and/or the user of the communication terminal.

Similarly, the gateway generally needs to be able to trust that the proxy device is authorized to stand-in for the communication terminal. In this case, the proxy device will contain the appropriate information to be trusted by the gateway.

It will be appreciated that the rapid-access message may contain various different pieces of information (including the actual information or database pointers to the information).

For example, the rapid-access message may also include an indication of the type of service requested by the communication unit (e.g., voice or data). If the service is for a voice call, the rapid-access message may also include an indication of the dialed digits (i.e., the phone number that the communication terminal is attempting to call). The rapid-access message may also include an indication of the equipment that is permitted to be the endpoint for the call (e.g., if the voice call is a Global System for Mobile Communications (GSM) call, then the endpoint must be a GSM device). The rapid-access message may also hide over-the-air (OTA) identity of the communication terminal.

It will be appreciated that the rapid-access message is passed between the radio and the proxy device via the satellite. When the rapid-access message is received at the satellite, the satellite may be configured to repackage/reformat the message for forwarding to the proxy device. Similarly, an antenna and associated transceiver circuitry operate with the gateway to transmit/receive signals to/from the satellite. Messages from the proxy device back to the radio are also routed through this transceiver circuitry, antenna, and satellite. For ease of illustration of the examples described herein, the satellite, transceiver circuitry, and antenna are considered transparent during the establishment of a communication session and the messages are described as being transmitted directly between the radio and the proxy device, and vice versa.

The proxy device is configured to parse the rapid-access message and exchange a number of messages with the gateway to set up the communication session between the terminal and the gateway. More specifically, based on the information in the rapid-access message (alone or in combination with information extracted from a local database), the proxy device is configured to generate and transmit a home gateway access message to the proxy device. This home gateway access message includes routing information, geographic data, service type, and a user identifier. From the perspective of the gateway, this home gateway access is as if it was received from the communication terminal rather than from a proxy device. The gateway uses the contents of the home gateway access message to determine the type of service (e.g., voice, video, data, etc.) requested by the radio. In response to the received home gateway access message, the gateway transmits an access decision message back to the proxy device. The access decision informs the proxy device whether the radio is to be granted access to the gateway (and the subsequent network). If the access decision indicates that the radio has been granted access to the gateway, the proxy device transmits a call control setup request back to the gateway. In response, the gateway transmits an authentication request to the proxy device that identifies certain information required in order for the gateway to authenticate the user and/or the radio. As noted above, the authentication information required to respond to this authentication request was identified in the rapid-access message (i.e., directly identified or identified through a database pointer) received by the proxy device. As such, the proxy device is configured to respond to the authentication request with an authentication response that includes the requested authentication information. After the user/radio is authenticated, the gateway will transmit a call control setup accept message to the proxy. At this point, the two-way communication session between the radio and the gateway has been established. As such, proxy device then transmits a confirmation message to the radio indicating that the radio can begin transmitting to the gateway. The confirmation message may be an aggregation of any information needed by the communication terminal to begin transmission.

FIG. 6 illustrates an example in which one confirmation message is transmitted from the proxy device to the radio. It will be appreciated that additional messages can be sent back to the radio at different times. It will also be appreciated that the above sequence of messages is merely one example, and that the particular messages, message order, etc., may vary for different communication systems. As such, the specific messages and order of messages described herein is not critical to aspects of the present invention.

In summary of the above, the proxy device essentially creates two sessions; one session with the communication terminal and a separate session with the gateway. As such, the proxy device can send asynchronous messages to the terminal and the gateway. In these examples, a new protocol (i.e., the rapid access message, the confirmation message, and any additional messages) exists between the communication terminal and the proxy device, and an open/standard protocol exists between the proxy device and the gateway. In essence, a single proxy device is used to "translate" between the new protocol and the open protocols.

As noted, in conventional arrangements the various messages required for establishment of the communication session are exchanged between the radio and the gateway (via the satellite). The propagation delays inherent to such communication (e.g., approximately 750 ms to 1 second for each of the messages to be transmitted between the communication terminal and the terminal, and vice versa) resulted in a significant time period to establish the session (e.g., upwards of approximately 8 to 10 seconds). In embodiments described herein, the proxy device is located in close proximity (relative to the communication terminal) to the gateway. The close proximity of the proxy device to the gateway substantially eliminates the propagation delays such that the time period required for the establishment of the communication session is significantly shorter (e.g., 1 to 3 seconds).

Having described techniques for proxy-based establishment of a communication session, it is believed that other modifications, variations and changes will be suggested to those skilled in the art in view of the teachings set forth herein. It is therefore to be understood that all such variations, modifications and changes are believed to fall within the scope of the present invention as defined by the appended claims. Although specific terms are employed herein, they are used in a generic and descriptive sense only and not for purposes of limitation.

What is claimed is:

1. A method for establishing a communication session in a satellite communication system, comprising:

receiving, at a terrestrial proxy device located in proximity to a terrestrial network node device via a satellite, a rapid-access message from a terrestrial communication terminal that includes information enabling the proxy device to function on behalf of the communication terminal to establish the communication session between the communication terminal and the network node device, wherein the information in the rapid-access message comprises an indication of characteristics of the communication terminal and an indication of connection destination;

in response to receiving the rapid-access message at the proxy device, exchanging a plurality of messages that do not pass through the satellite with the network node device to perform a plurality of session establishing phases using the information in the rapid-access message such that the proxy device establishes the communication session with the network node device on behalf of the communication terminal; and transmitting at least one confirmation message from the proxy device to the communication terminal via the satellite to notify the communication terminal of the establishment of the communication session between the communication terminal and the network node device.

2. The method of claim 1, wherein exchanging a plurality of messages with the network node device comprises:
transmitting a home gateway access message from the proxy device to the gateway; and
receiving an access decision message from the gateway at the proxy device.

3. The method of claim 1, wherein exchanging a plurality of messages with the network node device comprises:
transmitting a call control setup request message from the proxy device to the gateway;
receiving an authentication request message from the gateway at the proxy device;
transmitting an authentication response message to the from the proxy device to the gateway; and
receiving a call control setup accept message from the gateway at the proxy device.

4. The method of claim 1, wherein receiving information enabling the proxy device to function on behalf of the communication terminal to establish the communication session comprises:
receiving one or more pointers to information stored in a database on the proxy device.

5. The method of claim 1, wherein receiving the rapid-access message comprising information enabling the proxy device to function on behalf of the communication terminal to establish the communication session comprises:
receiving, in the rapid-access message, authentication information for authenticating the communication terminal and/or a user of the communication terminal.

6. The method of claim 1, wherein receiving the rapid-access message comprising information enabling the proxy device to function on behalf of the communication terminal to establish the communication session comprises:
receiving, in the rapid-access message, an indication of the type of service requested by the communication terminal.

7. The method of claim 1, wherein receiving the rapid-access message comprising information enabling the proxy device to function on behalf of the communication terminal to establish the communication session comprises:
receiving an indication of dialed digits in the rapid-access message.

8. The method of claim 1, wherein receiving the rapid-access message comprising information enabling the proxy device to function on behalf of the communication terminal to establish the communication session comprises:
receiving a message that hides the over-the-air (OTA) identity of the communication terminal.

9. The method of claim 1, wherein the network node device is a terrestrial gateway.

10. A non-transitory processor readable medium in a terrestrial proxy device located in proximity to a terrestrial network node device, the processor readable medium storing instructions that, when executed by a processor, cause the processor to:
receive, via a satellite, a rapid-access message from a terrestrial communication terminal comprising information enabling the proxy device to function on behalf of the communication terminal to establish a communication session between the communication terminal and the network node device, wherein the information in the rapid-access message comprises an indication of characteristics of the communication terminal and an indication of connection destination;
in response to receiving the rapid-access message, exchange a plurality of messages that do not pass through the satellite with the network node device to perform a plurality of session establishing phases using the information in the rapid-access message such that the proxy device establishes a communication session with the network node device on behalf of the communication terminal; and
transmit at least one confirmation message to the communication terminal via the satellite to notify the communication terminal of the establishment of the communication session between the communication terminal and the network node device.

11. The processor readable medium of claim 10, wherein the rapid-access message comprises one or more pointers, and further comprising instructions that cause the processor to:
obtain, based on the one or more pointers in the rapid-access message, information stored in a database on the proxy device.

12. The processor readable medium of claim 10, wherein the instructions to exchange a plurality of messages with the network node device further comprise instructions that cause the processor to:
transmit a home gateway access message from the proxy device to the gateway; and
receive an access decision message from the gateway at the proxy device.

13. The processor readable medium of claim 10, wherein the instructions to exchange a plurality of messages with the network node device further comprise instructions that cause the processor to:
transmit a call control setup request message from the proxy device to the gateway;
receive an authentication request message from the gateway at the proxy device;
transmit an authentication response message from the proxy device to the gateway; and
receive a call control setup accept message from the gateway at the proxy device.

14. The processor readable medium of claim 10, wherein the instructions to receive the rapid-access message comprises instructions that cause the processor to:
receive, in the rapid-access message, authentication information for authenticating the communication terminal and/or a user of the communication terminal.

15. The processor readable medium of claim 10, wherein the instructions to receive the rapid-access message comprises instructions that cause the processor to:
receive, in the rapid-access message, an indication of the type of service requested by the communication terminal.

16. The processor readable medium of claim 10, wherein the instructions to receive the rapid-access message comprises instructions that cause the processor to:
receive, in the rapid-access message, an indication of dialed digits.

17. The processor readable medium of claim 10, wherein the instructions to receive the rapid-access message comprises instructions that cause the processor to:
receive a message that hides the over-the-air (OTA) identity of the communication terminal.

18. A terrestrial proxy device located in proximity to a terrestrial network node device, comprising:

a network interface configured to receive a rapid-access message transmitted via a satellite by a communication terminal that includes information enabling the proxy device to function on behalf of the communication terminal to establish the communication session between the communication terminal and the network node device, wherein the information in the rapid-access message comprises an indication of characteristics of the communication terminal and an indication of connection destination; and a processor configured to:
exchange, in response to receiving the rapid-access message, a plurality of messages that do not pass through the satellite with the network node device to perform a plurality of session establishing phases using the information in the rapid-access message such that the proxy device establishes the communication session with the network node device on behalf of the communication terminal, and transmit at least one confirmation message from the proxy device to the communication terminal via the satellite to notify the communication terminal of the establishment of the communication session between the communication terminal and the network node device.

19. The proxy device of claim 18, wherein the rapid-access message comprises one or more pointers, and wherein the processor is configured to:
obtain, based on the one or more pointers in the rapid-access message, information stored in a database on the proxy device.

20. The proxy device of claim 18, wherein to exchange a plurality of messages with the network node device, the processor is configured to:

transmit a home gateway access message from the proxy device to the gateway; and
receive an access decision message from the gateway at the proxy device.

21. The proxy device of claim 18, wherein to exchange a plurality of messages with the network node device, the processor is configured to:
transmit a call control setup request message from the proxy device to the gateway;
receive an authentication request message from the gateway at the proxy device;
transmit an authentication response message to the from the proxy device to the gateway; and
receive a call control setup accept message from the gateway at the proxy device.

22. The proxy device of claim 18, wherein the rapid-access message comprises authentication information for authenticating the communication terminal and/or a user of the communication terminal.

23. The proxy device of claim 18, wherein the rapid-access message comprises an indication of the type of service requested by the communication terminal.

24. The proxy device of claim 18, wherein the rapid-access message comprises an indication of dialed digits.

25. The proxy device of claim 18, wherein the network interface is configured to receive the rapid-access message that is configured to hide the over-the-air (OTA) identity of the communication terminal.

26. The method of claim 18, wherein the network node device is a terrestrial gateway.

* * * * *